INVENTOR.
ROBERT E. COLWELL

BY

ATTORNEY

United States Patent Office

3,525,504
Patented Aug. 25, 1970

3,525,504
ADDITIVE MIXER
Robert E. Colwell, Chapel Hill, N.C., assignor to Monsanto Company, St. Louis, Mo., a corporation of Delaware
Filed Sept. 26, 1968, Ser. No. 762,900
Int. Cl. B01f 7/02
U.S. Cl. 259—25                    2 Claims

ABSTRACT OF THE DISCLOSURE

A novel apparatus for efficiently mixing any number of additives into a continuous stream; the apparatus itself being avantageously employed with conventional extruders for polymeric materials where there is generally a short mixing time and a low rotational speed.

BACKGROUND OF THE INVENTION

Field of the invention

This invention pertains to a novel apparatus and method for intimately mixing at least two fluid streams of varied rheological behavior. In particular, this invention relates to a method and apparatus for incorporating and efficiently mixing various additives into a main fluid stream, especially in laminar flow mixing.

Description of the prior art

The mixing of pastes, plastics and other heavy and hard-to-mix substances with other additives during passage along a continuous stream present a number of problems related to the materials used and the equipment employed. Extruders, in particular, present numerous blending and mixing difficulties.

Generally, during extrusion operations materials are fed through the extruder's hopper into an end of a conical or cylindrical shaped chamber and discharge through a die head at the other end of the extruder. During the process of extrusion a number of additives such as pigments, plasticizers, antioxidants, foaming agents, flame retarding agents and the like can be introduced by means of a suitable liquid injector and mixed thereafter within the confines of the chamber just prior to ejection into a die head. With conventional extruders mixing takes place in a chamber enhanced by blade action of screw lands and other mixing elements as the material proceeds downstream.

Problems arise in dispersing and distributing additives prior to reaching the die head so that there is uniform distribution throughout at and after the point of additive entry. Generally, mixing is accomplished by employing a plurality of transversal blades or a series of cams, eccentric or non-eccentric, working within a given mixing zone. Further, by such agitating devices or by employing a simple helical agitator turning within a stationary conical chamber of an extruder it is readily found that such devices fail to offer an adequate means for producing a uniform combination of two or more materials. In extrusion equipment the screw is fixed generally as to the maximum rotational speed during the blending and mixing of polymeric material for continuous streams and this consequently places limitations upon the capacity, pressure, and thermal requirements of the equipment. In order to thoroughly mix injected materials adequate dispersion at low rotational speeds and within quite short mixing times should be achieved.

SUMMARY OF THE INVENTION

The novel invention relates to accomplishing thorough mixing of substances introduced into a continuous stream moving at low rotational speeds and within short mixing times. The novel apparatus comprises a stationary cylindrical housing having a stream passageway therethrough; a shaft centrally situated within said housing and rotatable about its longitudinal axis within the passageway; a distributor mounted on said shaft and rotatable therewith, the distributor being disc shape and having a plurality of openings in the form of ports or slits evenly distributed and surrounding the distal portion of said distributor; an additive feed line having an outlet venting within the housing and secured thereto, said line adjacent and aligned with respect to said openings of the distributor and positioned before the centers thereof; a cylindrical dam mounted to said shaft, proximate the distributor and turning therewith, said dam located downstream from the distributor, said dam positionally maintained to allow a small annular void with respect to the housing; a spacing member connecting the distributor with the cylindrical dam, said member having the identical longitudinal axis as the shaft and extending radially just short of the openings of said distributor, said member commencing prior to the additive feed line and terminating with the cylindrical dam; and means for rotating said shaft within said housing.

It is the object of the invention to provide an improved apparatus for thoroughly mixing two or more fluid substances in a continuous flow process stream where there may be similar or diverse rheological behavior.

It is another object of the invention to provide a method and apparatus for incorporating and intimately mixing substances into a thermoplastic stream within an extruder.

Another object of the present invention is to provide an apparatus and method for the continuous mixing of a plurality of fluids and melts within the short mixing time and at low rotational speeds.

Other objects and advantages will be apparent from the following description.

DESCRIPTION OF THE PREFERRED EMBODIMENTS

As extrusion techniques are well-known to those skilled in that particular art there is no need to go into such practices generally. The subject mixing apparatus as to its structural and operational features will be given in more detail in conjunction with conventional extrusion practices.

Figure 1:
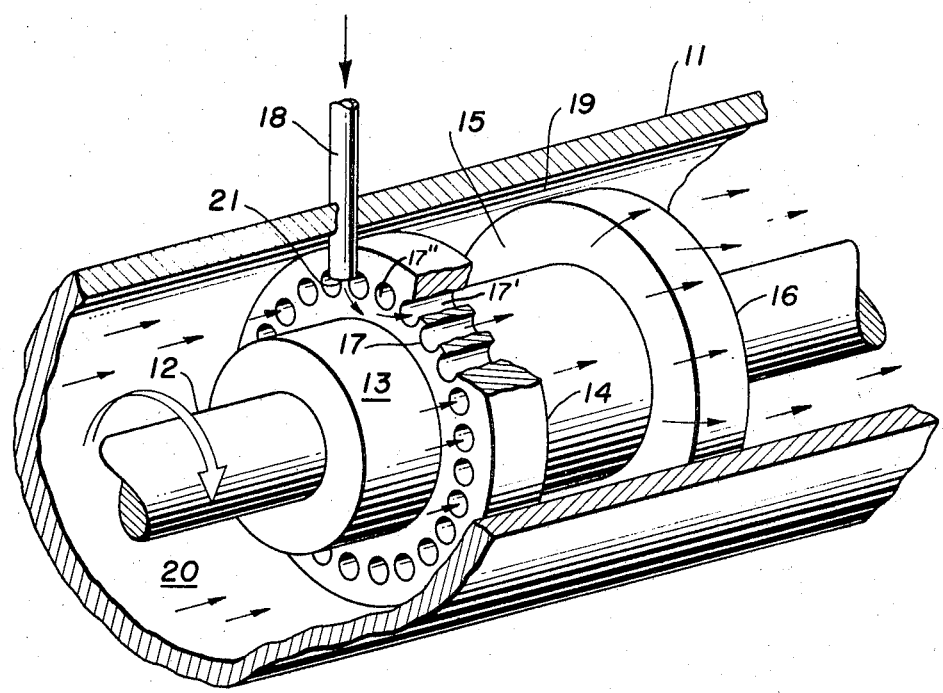
FIG. 1 shows the novel apparatus of this invention.
Figure 2:
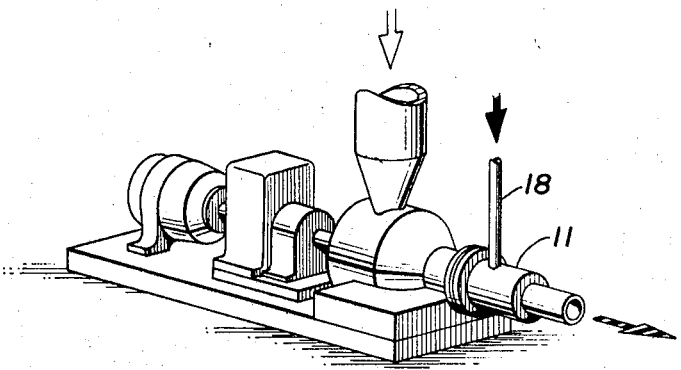
FIG. 2 shows the device attached to a conventional extruder.

FIG. 1 shows a preferred embodiment of the instant invention. Referring now in detail to FIG. 1 the fluid stream enters at the left and proceeds generally to the right, as indicated by the arrows.

Mounted to a main stationary cylindrical housing 11 is an additive feed line 18 to which is externally secured a liquid injector (not shown). An opening 21 of the additive feed line 18 vents itno the main stream passageway 20. A shaft 12 is centrally situated within the housing 11 and rotatable about its longitudinal axis within the passageway 20. Positioned slightly upstream from feed line 18 is a short cylindrical extension of shaft 12 and secured thereto, a spacing member 13 which is connected to a distributor 14, a disc shape member, mounted on shaft 12 and rotatable therewith. Evenly spaced and at the distal portion of distributor 14 are a plurality of ports or openings 17, 17', 17", etc. It is to be noted that spacing member 13 extends radially just short of the plurality of said openings. Adjacent distributor 14 is a continuation of spacing member 13, giving rise to a greater annular chamber 15. At the downstream end of spacing member 13 is a cylindrical dam 16 mounted to the shaft 12 and abutting and terminating with said spacing member 13. The space between the cylindrical dam 16 and the housing 11 is a small annular clearance 19.

It is to be noted that the additive feed line 18 being secured to housing 11 is a stationary conduit situated adjacent and aligned upstream with respect to the ports of the distributor 14 and positioned substantially before the centers of the ports thereof.

The operation of the mixer is as follows: The additive fluid stream enters through feed line 18 which is adjustable and can be positioned in depth just before the centers of openings 17, 17', 17'', etc. As these openings or ports rotate past the additive feed line 18 an injected material is caused to flow through opening 17, then 17', then 17'', etc., sequentially as the distributor 14 rotates past feed line 18. In effect, the additive is caught up in the flow of the main fluid stream during its course through the extruder. Although some material may pass over the top of the distributor 14, the main flow is through ports 17, 17', 17'', etc., which provide a lower resistance path. It can be readily appreciated that when the additive is in port 17 the stream accelerates and develops, at least partially, a parabolic velocity profile resulting in longitudinal mixing of the additive. There is also an angular advance in the direction of rotation due to the rotation of the extruder screw. When the stream from 17 exits into the spaced annular chamber 15 above the spacing member 13 it decelerates and undergoes additional rotational and radial mixing. This is followed by a short duration of relatively high velocity mixing as all of the fluid passes over the top of the cylindrical cam 16. Thus, the advancing material from the annular opening 19 issues toward the subsequent extrusion screw pumping and mixing sections. Manifestly, the mixing performance of a system is enhanced as the additive stream or streams issuing from the subject invention are distributed in depth throughout the entire volume of the apparatus downstream from the point of injection.

Although the operational features of the instant invention are directed to extrusion processes it can be apparent to those skilled in the art of mixing that other machines requiring adequate blending or mixing of additives into a continuous stream phase may utilize the novel mixer described herein.

It is to be understood that more than two fluids may be mixed with the apparatus and by the means of the present invention. Any number of liquid additives may be incorporated through the use of individually placed injectors secured to the cylindrical housing and positioned as aforementioned. In this manner a number of fluids may be sequentially or concurrently mixed in comparatively small traces into the primary flow passageway.

The above descriptions and drawings are set forth for purposes of illustration only for many variations and modifications thereof will be apparent to those skilled in the art and can be made without departing from the spirit and scope of the invention herein defined by the appended claims.

That which I claim is:

1. An apparatus for mixing fluids along a continuous stream of a passageway which comprises:
    (a) a cylindrical stationary housing having the passageway therethrough;
    (b) a shaft centrally situated within said housing and rotatable about its longitudinal axis within the passageway;
    (c) a distributor mounted on said shaft and rotatable therewith, the distributor being disc shape and having a plurality of openings evenly distributed, the openings surrounding the distal portion of said distributor;
    (d) an additive feed line having an inlet within the housing and secured thereto, said line adjacent and aligned with respect to the openings of the distributor and positioned before the centers of the ports thereof;
    (e) a cylindrical dam mounted to said shaft, proximate the distributor and turning therewith, said dam located downstream from the distributor, said dam positionally maintained to allow an annular clearance with respect to said housing;
    (f) a spacing member connecting the distributor with the cylindrical dam, said member having the identical longitudinal axis as the shaft and extending radially just short of the openings, said member commencing prior to the additive feed line and terminating with the cylindrical dam; and
    (g) means for rotating said shaft within said housing.

2. The apparatus as recited in claim 1 wherein the plurality of openings in the distributor are circumferentially arranged and equally spaced.

References Cited

UNITED STATES PATENTS

| | | | |
|---|---|---|---|
| 1,120,534 | 12/1914 | Pruden | 259—26 |
| 3,062,512 | 11/1962 | Carter | 259—25 |
| 3,130,070 | 4/1964 | Potters | 259—9 X |
| 3,403,523 | 10/1968 | Bauer | 259—9 X |

ROBERT W. JENKINS, Primary Examiner